United States Patent
Sugaya

(10) Patent No.: US 11,767,010 B2
(45) Date of Patent: Sep. 26, 2023

(54) DRIVING ASSIST SYSTEM

(71) Applicant: Toyota Jidosha Kabushiki Kaisha, Toyota (JP)

(72) Inventor: Fumio Sugaya, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 316 days.

(21) Appl. No.: 17/173,489

(22) Filed: Feb. 11, 2021

(65) Prior Publication Data

US 2021/0284141 A1 Sep. 16, 2021

(30) Foreign Application Priority Data

Mar. 10, 2020 (JP) ................. 2020-041046

(51) Int. Cl.
  *B60W 30/09* (2012.01)
  *G08G 1/16* (2006.01)
  *B60W 10/20* (2006.01)
  *B60W 10/18* (2012.01)
  *B60W 30/095* (2012.01)

(52) U.S. Cl.
  CPC ............ *B60W 30/09* (2013.01); *B60W 10/18* (2013.01); *B60W 10/20* (2013.01); *B60W 30/0953* (2013.01); *B60W 30/0956* (2013.01); *G08G 1/16* (2013.01); *B60W 2554/4041* (2020.02); *B60W 2554/4042* (2020.02); *B60W 2554/4044* (2020.02)

(58) Field of Classification Search
  CPC ...... B60W 30/09; B60W 10/18; B60W 10/20; B60W 30/0953; B60W 30/0956; B60W 2554/4041; B60W 2554/4042; B60W 2554/4044; G08G 1/16; G08G 1/166
  See application file for complete search history.

(56) References Cited

U.S. PATENT DOCUMENTS

| 10,671,076 B1 * | 6/2020 | Kobilarov ............... G08G 1/166 |
| 2008/0288140 A1 | 11/2008 | Matsuno |

(Continued)

FOREIGN PATENT DOCUMENTS

| JP | 2007099237 A | 4/2007 |
| JP | 2008003762 A | 1/2008 |

(Continued)

*Primary Examiner* — Ian Jen
*Assistant Examiner* — Danielle Marie Jackson
(74) *Attorney, Agent, or Firm* — Dinsmore & Shohl LLP

(57) ABSTRACT

A driving assist system executes risk avoidance control for reducing a risk of collision with a target existing ahead of a vehicle. A vehicle state parameter includes imaginary relative position and velocity of the vehicle. A target state parameter includes expected direction and speed of movement the target. A risk value is expressed by a function of an estimated collision speed between the vehicle defined by the vehicle state parameter and the target defined by the target state parameter. The driving assist system sets multiple patterns of the target state parameter and sets a probability of each target state parameter. A partial risk value is the risk value when each target state parameter is used. A final risk value applied to the risk avoidance control is a sum of products of the probability and the partial risk value with respect to the multiple patterns of target state parameter.

12 Claims, 17 Drawing Sheets

(56) References Cited

U.S. PATENT DOCUMENTS

| | | | |
|---|---|---|---|
| 2009/0012703 A1* | 1/2009 | Aso | G05D 1/0214 |
| | | | 701/532 |
| 2011/0246156 A1* | 10/2011 | Zecha | G06V 40/23 |
| | | | 703/6 |
| 2017/0162050 A1* | 6/2017 | Chen | B60W 30/08 |
| 2017/0262750 A1* | 9/2017 | Kozuka | G06V 40/103 |
| 2017/0287340 A1 | 10/2017 | Suzuki et al. | |
| 2019/0092320 A1 | 3/2019 | Nagata et al. | |
| 2020/0098270 A1* | 3/2020 | Günther | G08G 1/166 |
| 2020/0174481 A1* | 6/2020 | Van Heukelom | G06N 3/044 |
| 2021/0139024 A1* | 5/2021 | Crego | G08G 1/166 |
| 2021/0221405 A1* | 7/2021 | Zhu | B60W 60/00274 |
| 2022/0348297 A1* | 11/2022 | Nakagawa | G01C 21/20 |

FOREIGN PATENT DOCUMENTS

| | | | |
|---|---|---|---|
| JP | 2008171207 A | 7/2008 | |
| JP | 2009-026321 A | 2/2009 | |
| JP | 2011257984 A | 12/2011 | |
| JP | 4935795 B2 | 5/2012 | |
| JP | 2017182730 A | 10/2017 | |
| JP | 2017-206117 A | 11/2017 | |
| JP | 2018-140749 A | 9/2018 | |
| JP | 2019066915 A | 4/2019 | |

\* cited by examiner

DRIVING ASSIST SYSTEM

CROSS-REFERENCE TO RELATED APPLICATIONS

This application claims priority to Japanese Patent Application No. 2020-041046, which is incorporated herein by reference in its entirety including the specification, drawings, and abstract.

BACKGROUND

Technical Field

The present disclosure relates to driving assist control that assists driving of a vehicle. In particular, the present disclosure relates to risk avoidance control for reducing a risk of collision with a target existing ahead of a vehicle.

Background Art

Patent Literature 1 discloses a driving assist device. The driving assist device detects an obstacle existing ahead of a vehicle and assumes a potential risk existing in a blind area behind the obstacle. The potential risk is an imaginary moving object that exists in the blind area behind the obstacle. It is assumed that the imaginary moving object moves perpendicularly to a roadway at a predetermined speed and enters the roadway. The driving assist device calculates a risk degree of the potential risk based on an estimated collision speed between the vehicle and the imaginary moving object. In particular, the driving assist device assumes a plurality of different vehicle positions and vehicle speeds to calculate a risk field indicating the risk degree for each of the plurality of vehicle positions and vehicle speeds. Then, the driving assist device sets an appropriate vehicle trajectory based on the risk field.

LIST OF RELATED ART

Patent Literature 1: Japanese Laid-Open Patent Application Publication No. JP-2017-206117

SUMMARY

"Risk avoidance control" for reducing a risk of collision with a target existing ahead of a vehicle is considered. In order to appropriately execute the risk avoidance control, it is necessary to appropriately estimate a magnitude of the risk of collision with the target. The reason is that if the risk of collision is overestimated, the risk avoidance control operates excessively or unnecessarily.

According to the technique disclosed in the above-mentioned Patent Literature 1, it is assumed that the imaginary moving object existing in the blind area behind the obstacle moves perpendicularly to the roadway at a predetermined speed and enters the roadway. However, an actual target does not necessarily move perpendicularly to the roadway and enter the roadway. If such the assumption is also applied to a target existing not in the blind area but in an area recognizable from the vehicle, the risk of collision is overestimated and thus the risk avoidance control is likely to operate excessively or unnecessarily.

An object of the present disclosure is to provide a technique capable of suppressing an excessive operation or an unnecessary operation of the risk avoidance control for reducing the risk of collision with the target existing ahead of the vehicle.

A first aspect is directed to a driving assist system that assists driving of a vehicle.

The driving assist system includes a memory and a processor.

The memory stores driving environment information indicating a driving environment for the vehicle.

The processor executes, based on the driving environment information, risk avoidance control including at least one of steering control and deceleration control for reducing a risk of collision with a target existing ahead of the vehicle.

A vehicle state parameter includes an imaginary relative position between the vehicle and the target and an imaginary velocity of the vehicle.

A target state parameter includes an expected direction of movement and an expected speed of movement of the target.

A risk value regarding the target is expressed by a function of an estimated collision speed between the vehicle defined by the vehicle state parameter and the target defined by the target state parameter.

A risk field indicates a distribution of the risk value with respect to multiple patterns of the vehicle state parameter.

The driving environment information includes target information indicating a position, a direction of movement, and a speed of movement of the target.

The processor sets multiple patterns of the target state parameter.

The processor sets a probability of each of the multiple patterns of the target state parameter based on the target information.

The processor calculates the risk value when each of the multiple patterns of the target state parameter is used, as a partial risk value.

The processor sets the risk field by using the risk value that is a sum of products of the probability and the partial risk value with respect to the multiple patterns of the target state parameter.

The processor executes the risk avoidance control or determines whether or not an activation condition of the risk avoidance control is satisfied, based on the risk field.

A second aspect further has the following feature in addition to the first aspect.

The processor sets the multiple patterns of the target state parameter such that multiple patterns of the expected direction of movement are distributed in a circumferential direction with the target at a center.

A third aspect further has the following feature in addition to the second aspect.

The processor sets the multiple patterns of the target state parameter such that the multiple patterns of the expected direction of movement are uniformly distributed in the circumferential direction.

A fourth aspect further has the following feature in addition to the second or third aspect.

The processor sets the probability of the target state parameter to be higher as the expected direction of movement of the target state parameter is closer to the direction of movement of the target indicated by the target information.

A fifth aspect further has the following feature in addition to the second or third aspect.

The driving environment information further includes obstacle information indicating a position of an obstacle through which the target cannot pass.

The processor sets, based on the obstacle information, the probability of the target state parameter where the obstacle exists in the expected direction of movement to zero.

A sixth aspect further has the following feature in addition to any one of the first to fifth aspects.

The processor sets the multiple patterns of the target state parameter such that the expected speed of movement includes multiple patterns.

A seventh aspect further has the following feature in addition to the sixth aspect.

The processor sets the probability of the target state parameter to be higher as the expected speed of movement of the target state parameter is closer to the speed of movement of the target indicated by the target information.

An eighth aspect further has the following feature in addition to any one of the first to seventh aspects.

The target information further indicates a type of the target.

The processor calculates the probability based on the type of the target.

A ninth aspect further has the following feature in addition to any one of the first to eighth aspects.

When a number of the target is plural, the processor calculates a plurality of risk fields with respect to the plurality of targets and acquires the risk field by superimposing the plurality of risk fields.

A tenth aspect further has the following feature in addition to any one of the first to ninth aspects.

The processor is further configured to execute emergency braking control that decelerates the vehicle at a first deceleration when a time-to-collision with the target becomes less than a first threshold.

The processor calculates the estimated collision speed in consideration of an operation of the emergency braking control and calculates the risk value based on the estimated collision speed.

According to the present disclosure, the risk of collision with the target existing ahead of the vehicle is represented by the risk field. More specifically, the risk field indicates the distribution of the risk values with respect to the multiple patterns of the vehicle state parameter. The vehicle state parameter includes the imaginary relative position between the vehicle and the target and the imaginary velocity of the vehicle. The target state parameter includes the expected direction of movement and the expected speed of movement of the target. The risk value is expressed by the function of the estimated collision speed between the vehicle defined by the vehicle state parameter and the target defined by the target state parameter. That is to say, the risk value has a physical meaning rather than a sensuous one. Therefore, the risk field (the risk value) represents the risk of collision with the target with high accuracy.

Furthermore, according to the present disclosure, the multiple patterns of the target state parameter are taken into consideration in setting the risk field. More specifically, the probability of each of the multiple patterns of the target state parameter is set. The target does not move randomly but moves with a certain degree of continuity from its past movement. At least the latest direction of movement and speed of movement of the target serve as clues for estimating future direction of movement and speed of movement. It is therefore possible to set the probability of each target state parameter based on the target information indicating the direction of movement and the speed of movement of the target. Moreover, the risk value when each target state parameter is used is calculated as the partial risk value. Then, the sum of products of the probability and the partial risk value with respect to all patterns of the target state parameter is used as the final risk value.

As described above, in the setting of the risk field, the target state parameter is not fixed to one type, but the multiple patterns of the target state parameter are taken into consideration. That is, the multiple patterns of the target state parameter are reflected in the risk field. Therefore, the accuracy of the risk field representing the risk of collision with the target is further improved.

The highly accurate risk field thus obtained is applied to the risk avoidance control for reducing the risk of collision with the target. Since the risk field represents the risk of collision with high accuracy, the excessive operation or the unnecessary operation of the risk avoidance control is suppressed. For example, executing the risk avoidance control based on the highly accurate risk field makes it possible to suppress the excessive operation of the risk avoidance control. Furthermore, determining whether or not the activation condition of the risk avoidance control is satisfied based on the highly accurate risk field makes it possible to suppress the unnecessary operation of the risk avoidance control. As a result, a sense of strangeness about the excessive operation or the unnecessary operation of the risk avoidance control is reduced.

EMBODIMENTS

Embodiments of the present disclosure will be described with reference to the accompanying drawings.

1. Driving Assist System 1-1. Overview

Figure 1:
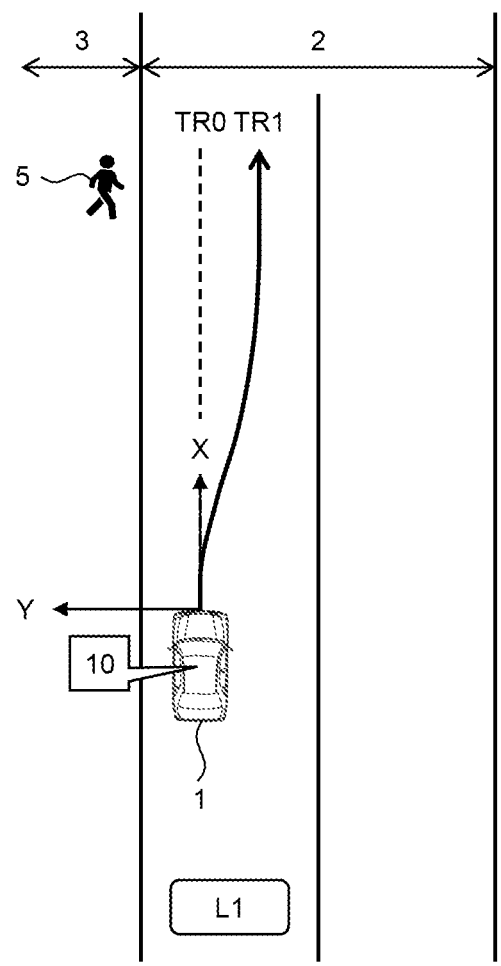
FIG. 1 is a conceptual diagram for explaining an outline of a driving assist system according to an embodiment of the present disclosure.

FIG. 1 is a conceptual diagram for explaining an outline of a driving assist system 10 according to the present embodiment. The driving assist system 10 executes "driving assist control" that assists driving of a vehicle 1. The driving assist control may be included in automated driving control. Typically, the driving assist system 10 is installed on the vehicle 1. Alternatively, at least a part of the driving assist system 10 may be disposed in an external device outside the vehicle 1 and remotely perform the driving assist control. That is, the driving assist system 10 may be distributed in the vehicle 1 and the external device.

The driving assist control includes "risk avoidance control" that avoids a risk existing ahead of the vehicle 1 in advance. More specifically, the driving assist system 10 recognizes a target 5 existing ahead of the vehicle 1. Typically, the target 5 is a moving object. Then, the driving assist system 10 executes the risk avoidance control in order to reduce (avoid) a risk of collision with the target 5 in advance. Such the risk avoidance control includes at least one of steering control and deceleration control.

For example, in FIG. 1, the vehicle 1 is traveling in a first lane L1 in a roadway 2. A pedestrian exists in a roadside area 3 (e.g., a road shoulder, a side strip, a sidewalk, etc.) adjacent to the roadway 2. The pedestrian may enter the roadway 2 (i.e., the first lane L1). Therefore, the pedestrian existing in the roadside area 3 is a risk to the vehicle 1. The driving assist system 10 executes the risk avoidance control as necessary in order to reduce the risk of collision with the pedestrian. For example, the driving assist system 10 automatically steers the vehicle 1 in a direction away from the pedestrian. In FIG. 1, a trajectory TR0 represents a trajectory of the vehicle 1 when the risk avoidance control is not executed. On the other hand, a trajectory TR1 represents a trajectory of the vehicle 1 when the risk avoidance control is executed.

The target 5 being a target of the risk avoidance control is not limited to the pedestrian existing in the roadside area 3. Other examples of the target 5 include a bicycle, a motorcycle, a parked vehicle, and the like that exist in the roadside area 3. Other examples of the target 5 include a pedestrian, a bicycle, a motorcycle, a preceding vehicle, and the like that exist in the roadway 2. That is, the target 5 being a target of the risk avoidance control includes at least one of a pedestrian, a bicycle, a motorcycle, and another vehicle that exist ahead of the vehicle 1.

1-2. Configuration Example

Figure 2:
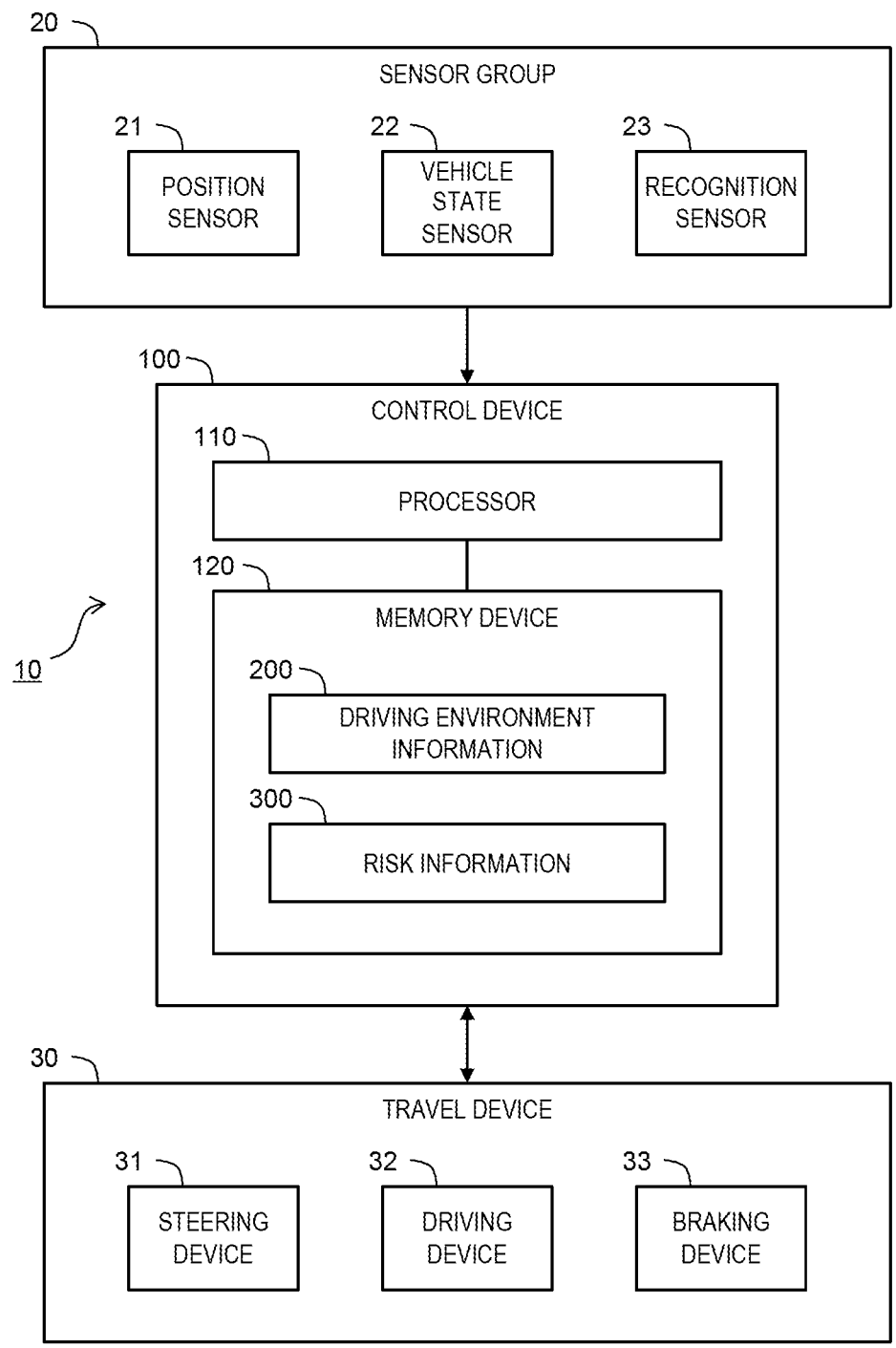
FIG. 2 is a block diagram showing a configuration example of a vehicle and the driving assist system according to an embodiment of the present disclosure.

FIG. 2 is a block diagram schematically showing a configuration example of the vehicle 1 and the driving assist system 10 according to the present embodiment. In particular, FIG. 2 shows a configuration example related to the risk avoidance control. The vehicle 1 includes a sensor group 20 and a travel device 30.

The sensor group 20 includes a position sensor 21, a vehicle state sensor 22, and a recognition sensor 23. The position sensor 21 detects a position and an orientation of the vehicle 1. As the position sensor 21, a GPS (Global Positioning System) sensor is exemplified. The vehicle state sensor 22 detects a state of the vehicle 1. Examples of the vehicle state sensor 22 include a vehicle speed sensor, a yaw rate sensor, a lateral acceleration sensor, a steering angle sensor, and the like. The recognition sensor 23 recognizes (detects) a situation around the vehicle 1. Examples of the recognition sensor 23 include a camera, a radar, a LIDAR (Laser Imaging Detection and Ranging), and the like.

The travel device 30 includes a steering device 31, a driving device 32, and a braking device 33. The steering device 31 turns (i.e., changes a direction of) the wheel of the vehicle 1. For example, the steering device 31 includes an electric power steering (EPS) device. The driving device 32 is a power source that generates a driving force. Examples of the driving device 32 include an engine, an electric motor, an in-wheel motor, and the like. The braking device 33 generates a braking force.

The driving assist system 10 includes at least a control device (controller) 100. The driving assist system 10 may include the sensor group 20. The driving assist system 10 may include the travel device 30.

The control device 100 controls the vehicle 1. Typically, the control device 100 is a microcomputer installed on the vehicle 1. The control device 100 is also called an ECU (Electronic Control Unit). Alternatively, the control device 100 may be an information processing device outside the vehicle 1. In that case, the control device 100 communicates with the vehicle 1 and remotely controls the vehicle 1.

The control device 100 includes a processor 110 and a memory device 120. The processor 110 executes a variety of processing. The memory device 120 stores a variety of information. Examples of the memory device 120 include a volatile memory, a nonvolatile memory, and the like. The variety of processing by the processor 110 (the control device 100) is achieved by the processor 110 executing a control program being a computer program. The control program is stored in the memory device 120 or recorded in a computer-readable recording medium.

1-3. Information Acquisition Process

The processor 110 (the control device 100) executes an "information acquisition process" that acquires driving environment information 200 indicating a driving environment for the vehicle 1. The driving environment information 200 is acquired based on a result of detection by the sensor group 20 installed on the vehicle 1. The acquired driving environment information 200 is stored in the memory device 120.

Figure 3:
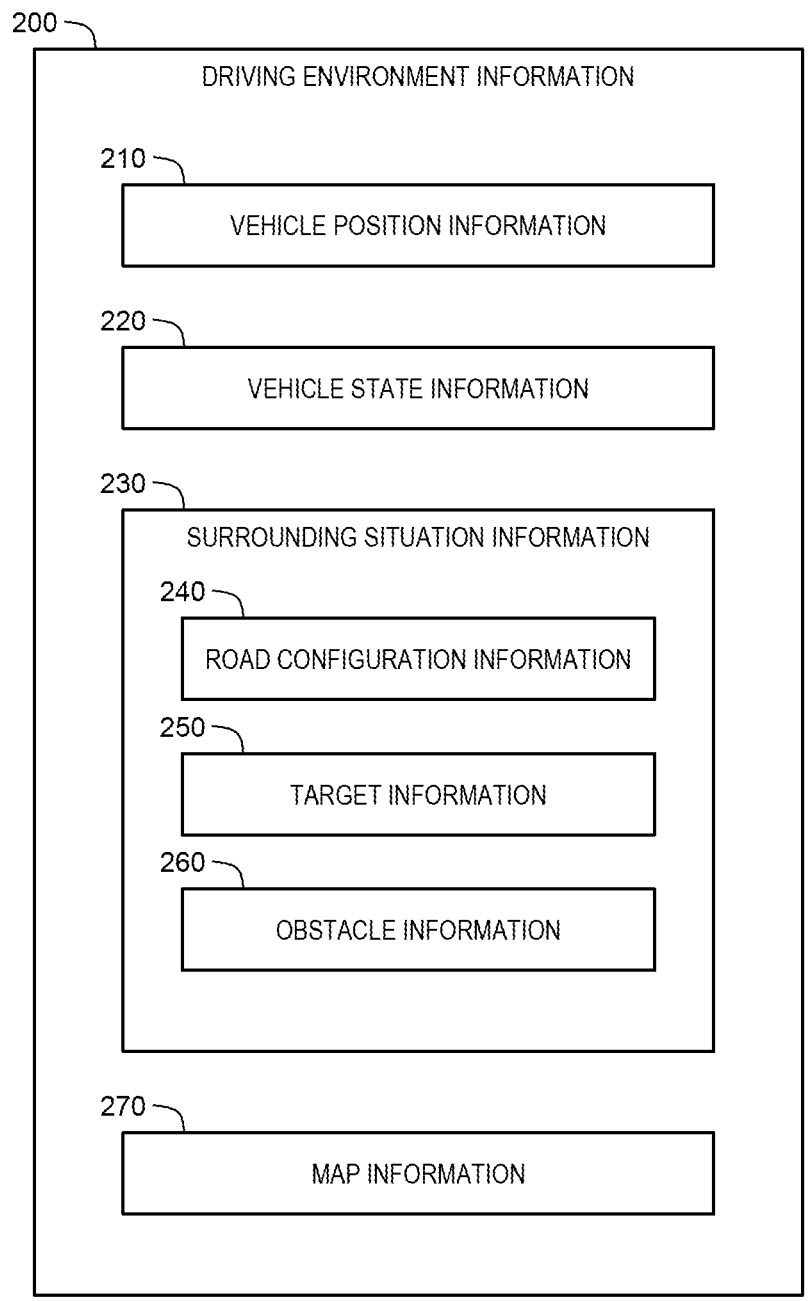
FIG. 3 is a block diagram showing an example of driving environment information in an embodiment of the present disclosure.

FIG. 3 is a block diagram showing an example of the driving environment information 200. The driving environment information 200 includes vehicle position information 210, vehicle state information 220, surrounding situation information 230, map information 270, and the like.

The vehicle position information 210 is information indicating the position and the orientation of the vehicle 1. The processor 110 acquires the vehicle position information 210 from a result of detection by the position sensor 21.

The vehicle state information 220 is information indicating the state of the vehicle 1. Examples of the state of the vehicle 1 include a vehicle speed, a yaw rate, a lateral acceleration, a steering angle, and the like. The processor 110 acquires the vehicle state information 220 from a result of detection by the vehicle state sensor 22.

The surrounding situation information 230 is information indicating a situation around the vehicle 1. The surrounding situation information 230 includes information acquired by the recognition sensor 23. For example, the surrounding situation information 230 includes image information indicating a situation around the vehicle 1 imaged by the camera. As another example, the surrounding situation information 230 includes measurement information measured by the radar or the LIDAR. Further, the surrounding situation information 230 includes road configuration information 240, target information 250, and obstacle information 260.

The road configuration information 240 is information on a road configuration around the vehicle 1. The road configuration around the vehicle 1 includes lane markings (white lines) and road end objects. The road end object is a three dimensional object representing an end of a road. Examples of the road end object include a curb, a guardrail, a wall, a median strip, and the like. The road configuration information 240 indicates at least a position (a relative position with respect to the vehicle 1) of each of the lane marking and the road end object.

For example, analyzing the image information imaged by the camera makes it possible to identify the lane marking and calculate the relative position of the lane marking. Examples of the image analysis method include semantic segmentation and edge detection. Similarly, analyzing the image information makes it possible to identify the road end object and calculate the relative position of the road end object. Alternatively, the relative position of the road end object may be acquired from the radar measurement information.

The target information 250 is information on the target 5 around the vehicle 1. Examples of the target 5 include a pedestrian, a bicycle, a motorcycle, another vehicle (e.g., a preceding vehicle, a parked vehicle), and the like. The target information 250 indicates a relative position and a relative speed of the target 5 with respect to the vehicle 1. For example, analyzing the image information imaged by the camera makes it possible to identify the target 5 and calculate the relative position of the target 5. It is also possible to identify the target 5 and acquire the relative position and the relative speed of the target 5 based on the radar measurement information. The target information 250 may include a direction of movement and a speed of movement of the target 5. The direction of movement and the speed of movement of the target 5 can be calculated by tracking the position of the target 5. The target information 250 may include a history of the relative position, the relative speed, the direction of movement, and the speed of movement of the target 5 during a certain period in the past. The target information 250 may indicate a type of the target 5 (e.g., a pedestrian, a bicycle, a motorcycle, another vehicle, or the like).

The obstacle information 260 is information on an obstacle around the vehicle 1. Examples of the obstacle include a utility pole, a signboard, a wall, a building, and the like. The obstacle information 260 indicates at least a position (a relative position with respect to the vehicle 1) of the obstacle.

The map information 270 indicates a lane configuration, a road shape, and the like. The control device 100 acquires the map information 270 of a necessary area from a map database. The map database may be stored in a predetermined storage device installed on the vehicle 1, or may be stored in a management server outside the vehicle 1. In the latter case, the processor 110 communicates with the management server to acquire the necessary map information 270.

1-4. Vehicle Travel Control

The processor 110 (the control device 100) executes "vehicle travel control" that controls travel of the vehicle 1. The vehicle travel control includes steering control for controlling steering of the vehicle 1, acceleration control for controlling acceleration of the vehicle 1, and deceleration control for controlling deceleration of the vehicle 1. The processor 110 executes the vehicle travel control by controlling the travel device 30. More specifically, the processor 110 executes the steering control by controlling the steering device 31. The processor 110 executes the acceleration control by controlling the driving device 32. The control device 100 executes the deceleration control by controlling the braking device 33.

1-5. Emergency Braking Control

The processor 110 (the control device 100) executes "emergency braking control" that automatically decelerates the vehicle 1 in the event of an emergency. The emergency braking control is also called AEB (Autonomous Emergency Braking) or PCS (Pre-Crash Safety System). More specifically, the processor 110 calculates a time-to-collision (TTC) with the target 5 existing ahead of the vehicle 1 based on the driving environment information 200. The vehicle speed of the vehicle 1 is obtained from the vehicle state information 220. A distance to the target 5 is obtained from the target information 250. When the calculated time-to-collision becomes less than a first threshold, the processor 110 executes the deceleration control at a first deceleration to decelerate and stop the vehicle 1. The first deceleration is typically a predetermined value.

1-6. Risk Avoidance Control

The processor 110 (the control device 100) executes the driving assist control that assists driving of the vehicle 1. The driving assist control includes the risk avoidance control. The risk avoidance control is the vehicle travel control for reducing (avoiding) the risk of collision with the target 5 existing ahead of the vehicle 1 in advance, and includes at least one of the steering control and the deceleration control. The processor 110 executes the risk avoidance control based on the driving environment information 200 described above.

Hereinafter, the risk avoidance control according to the present embodiment will be described in more detail.

2. Basic Processing of Risk Avoidance Control

Figure 4:
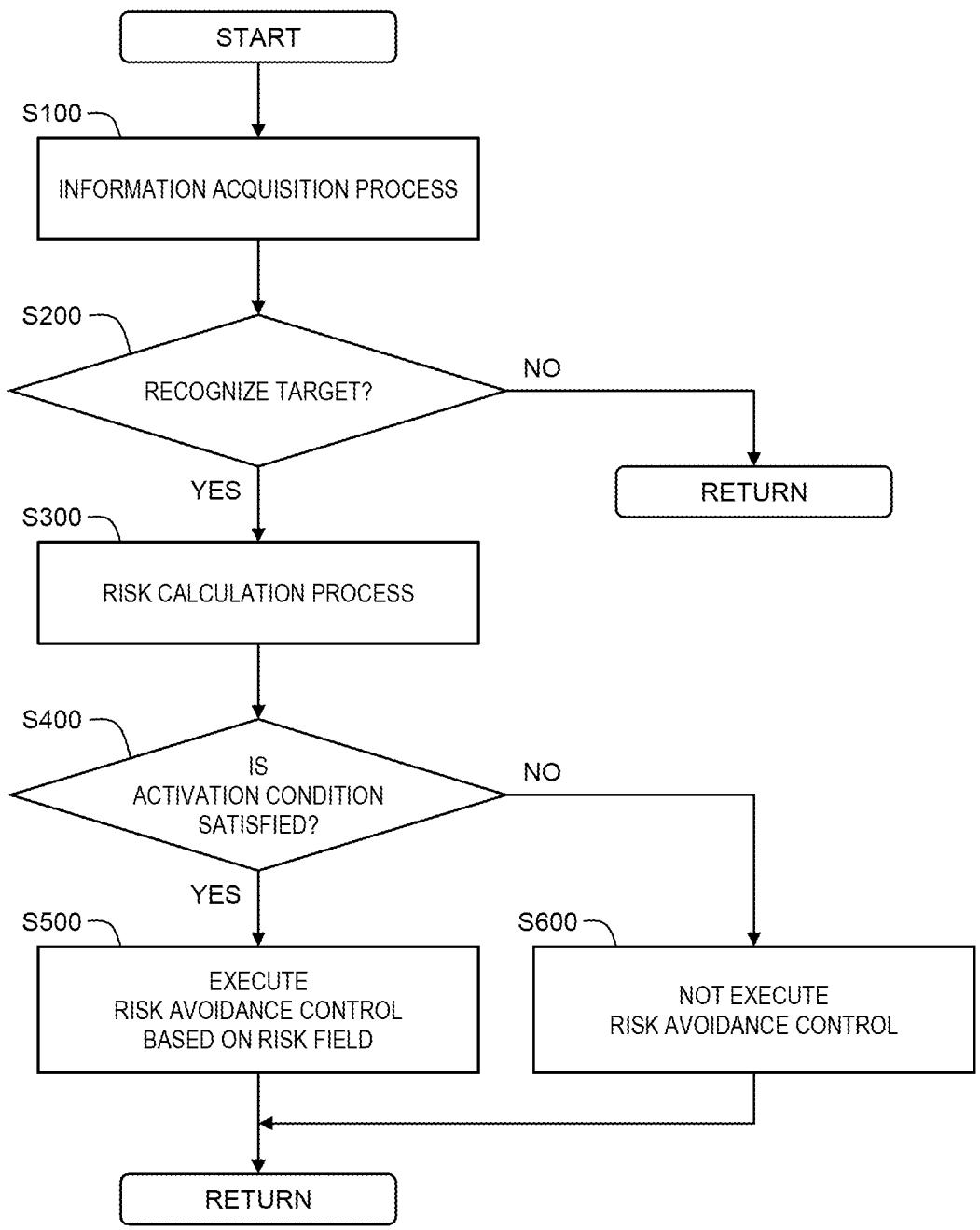
FIG. 4 is a flow chart showing basic processing related to risk avoidance control by the driving assist system according to an embodiment of the present disclosure.

FIG. 4 is a flow chart showing basic processing related to the risk avoidance control according to the present embodiment. The process flow shown in FIG. 4 is repeatedly executed at a predetermined cycle.

2-1. Step S100

In Step S100, the processor 110 executes the above-described information acquisition process. That is, the processor 110 acquires the driving environment information 200 based on the result of detection by the sensor group 20. The driving environment information 200 is stored in the memory device 120.

2-2. Step S200

In Step S200, the processor 110 determines whether or not a target 5 exists ahead of the vehicle 1 based on the target information 250. In other words, the processor 110 determines whether or not a target 5 is recognized in a region in front of the vehicle 1. Typically, the target 5 is a moving object. The target 5 includes at least one of a pedestrian, a bicycle, a motorcycle, and another vehicle that exist ahead of the vehicle 1. When the target 5 is recognized ahead of the vehicle 1 (Step S200; Yes), the processing proceeds to Step S300. Otherwise (Step S200; No), the processing returns to Step S100.

2-3. Step S300 (Risk Calculation Process)

In Step S300, the processor 110 estimates a risk of collision with the target 5. According to the present embodiment, the risk of collision with the target 5 is represented by a "risk field RF" that will be described below. That is, in Step S300, the processor 110 sets (calculates) the risk field RF with regard to the target 5. This process is hereinafter referred to as a "risk calculation process."

Figure 5:
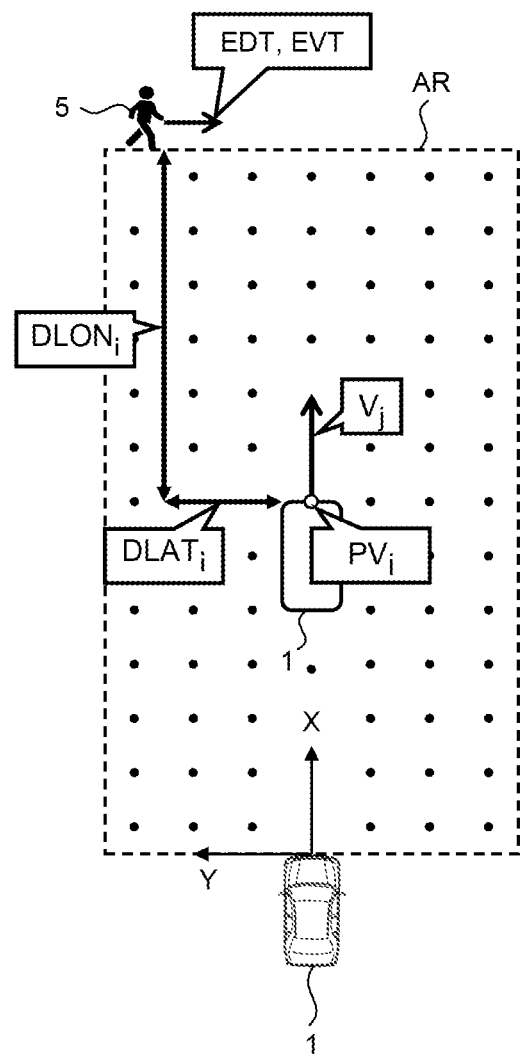
FIG. 5 is a conceptual diagram for explaining risk calculation process (Step S300) according to an embodiment of the present disclosure.

FIG. 5 is a conceptual diagram for explaining the risk calculation process according to the present embodiment. A vehicle coordinate system (X, Y) is a relative coordinate system fixed to the vehicle 1 and changes with a movement of the vehicle 1. An X-direction is a forward direction (travel direction) of the vehicle 1. A Y-direction is a lateral direction of the vehicle 1. The X-direction and the Y-direction are orthogonal to each other. In the following description, a longitudinal distance means a distance in the X-direction, and a lateral distance means a distance in the Y-direction.

First, the processor 110 sets a risk determination area AR ahead of the vehicle 1. The risk determination area AR is set so as to cover at least an area between the vehicle 1 and the target 5. A lateral width of the risk determination area AR is set so as to coincide with a lateral width of the roadway 2, for example. The relative position of the target 5 with respect to the vehicle 1 is obtained from the target information 250. The position of the roadway 2 is obtained from the road configuration information 240 or the map information 270.

The processor 110 sets a plurality of imaginary vehicle positions $PV_i$ in the risk determination area AR. The index i takes a value from 1 to an integer of 2 or more. Each vehicle position $PV_i$ is converted into an imaginary relative position between the vehicle 1 and the target 5 by using the position of the target 5 indicated by the target information 250. The imaginary relative position is represented by a longitudinal distance $DLON_i$ and a lateral distance $DLAT_i$ between the vehicle 1 and the target 5. Furthermore, the processor 110 sets a plurality of imaginary velocities $V_j$ for each vehicle position $PV_i$. The index j takes a value from 1 to an integer of 2 or more. A combination of the imaginary relative position $[DLAT_i, DLON_i]$ and the imaginary velocity $V_j$ is hereinafter referred to as a "vehicle state parameter $SV_{ij}$."

In addition, the processor 110 sets a "target state parameter ST" indicating a moving state of the target 5. The target state parameter ST includes an expected direction of movement EDT and an expected speed of movement EVT of the target 5.

Then, the processor 110 quantitatively estimates the risk of collision between the vehicle 1 defined by the vehicle state parameter $SV_{ij}$ and the target 5 defined by the target state parameter ST. According to the present embodiment, the risk of collision between the vehicle 1 and the target 5 is represented by a quantitative numerical value called a "risk value $R_{ij}$."

More specifically, the processor 110 determines whether or not the vehicle 1 defined by the vehicle state parameter $SV_{ij}$ collides with the target 5 defined by the target state parameter ST, and calculates an estimated collision speed $U_{ij}$ between the vehicle 1 and the target 5. When it is determined that the collision does not occur, the estimated collision speed $U_{ij}$ is set to 0. In determining whether or not a collision occur, an operation of the emergency braking control described above may be taken into consideration. The risk value $R_{ij}$ regarding the target 5 is expressed by a function of the estimated collision speed $U_{ij}$. For example, the risk value $R_{ij}$ is the estimated collision speed $U_{ij}$ itself. As another example, the risk value $R_{ij}$ may be the square of the estimated collision speed $U_{ij}$. In either case, the risk value $R_{ij}$ is given by a quantitative numerical value based on the estimated collision speed $U_{ij}$. As the estimated collision speed $U_{ij}$ increases, the risk value $R_{ij}$ increases.

As described above, the risk value $R_{ij}$ regarding the target 5 is expressed by a function of the vehicle state parameter $SV_{ij}$ and the target state parameter ST. The processor 110 sets multiple patterns of the vehicle state parameter $SV_{ij}$ in the risk determination area AR. Then, the processor 110 calculates the risk value $R_{ij}$ with respect to each of the multiple patterns of the vehicle state parameter $SV_{ij}$. As a result, a distribution of the risk values $R_{ij}$ with respect to the multiple patterns of the vehicle state parameter $SV_{ij}$ is obtained. Such the distribution of the risk values $R_{ij}$ with respect to the multiple patterns of the vehicle state parameter $SV_{ij}$ is the risk field RF.

Figure 6:
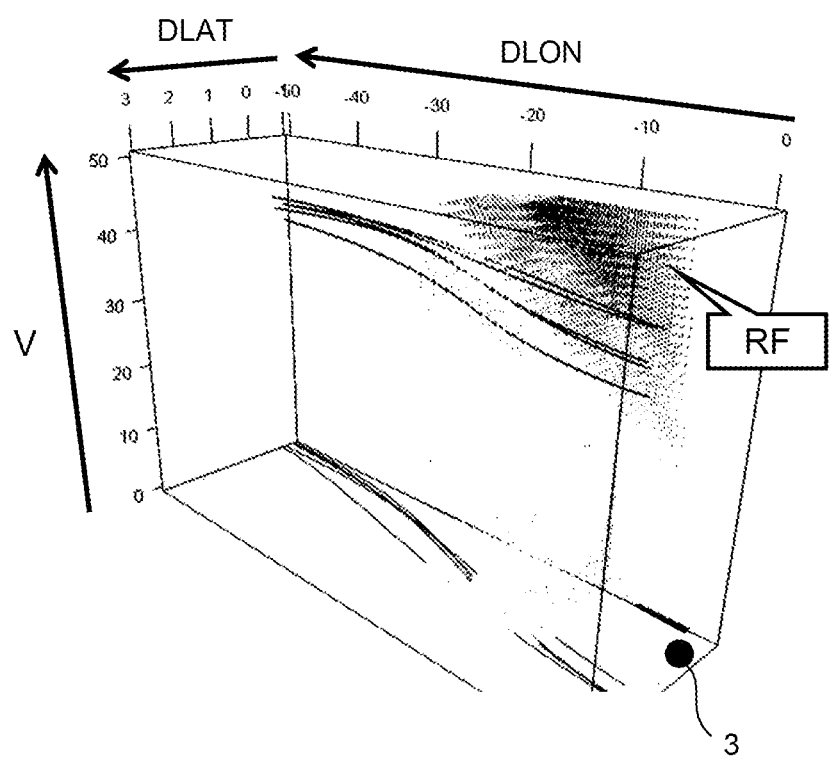
FIG. 6 is a diagram showing an example of a risk field in an embodiment of the present disclosure.

FIG. 6 shows an example of the risk field RF. The risk field RF indicates the distribution of the risk values $R_{ij}$ in a three-dimensional space defined by the longitudinal distance DLON, the lateral distance DLAT, and the velocity V. A position in the three-dimensional space corresponds to the vehicle state parameter $SV_{ij}$. The risk values $R_{ij}$ are calculated with respect to a large number of positions in the three-dimensional space. In particular, black dots in FIG. 6 represent cases where the collision between the vehicle 1 and the target 5 occurs, and each black dot has the risk value $R_{ij}$ larger than 0.

Figure 7:
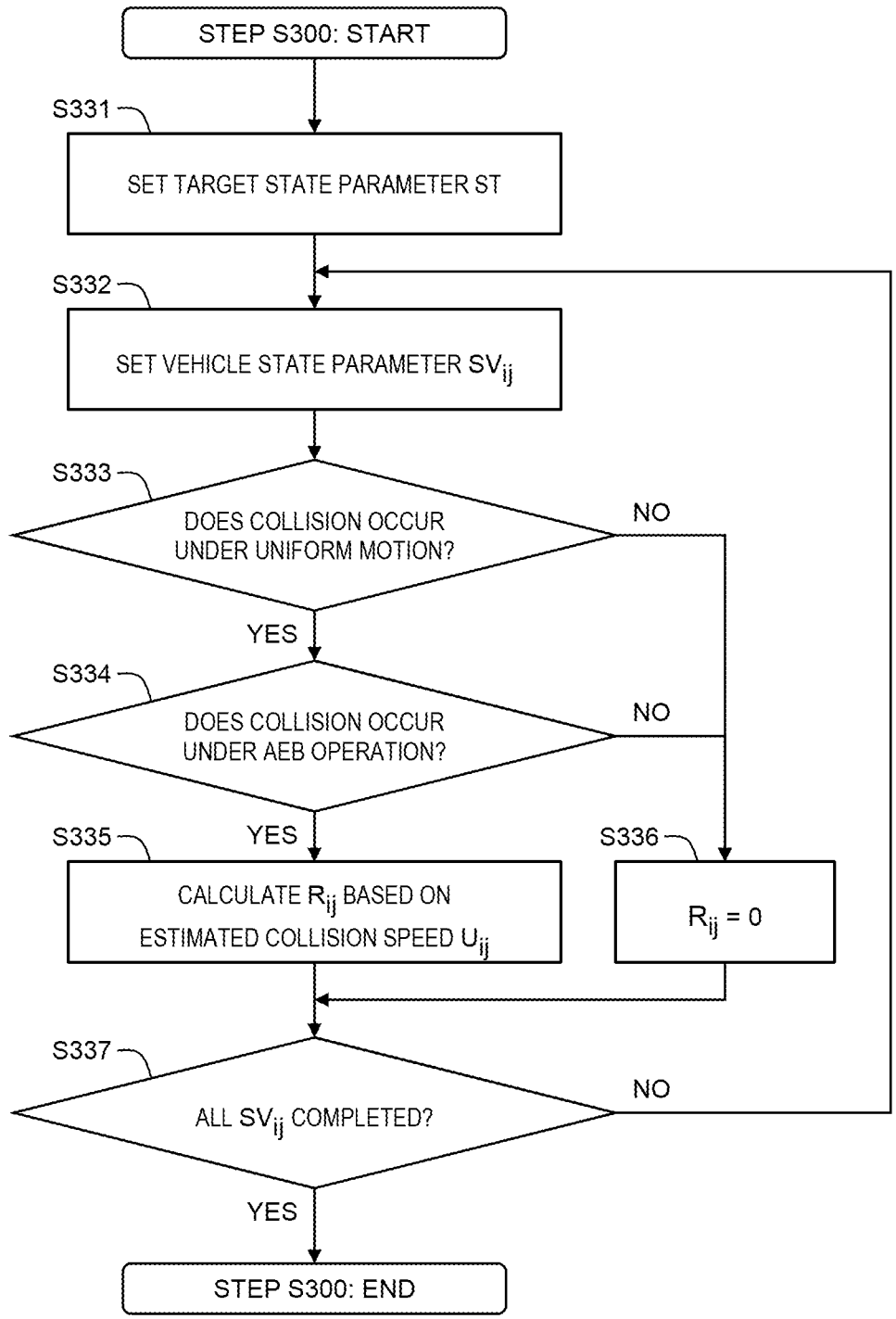
FIG. 7 is a flow chart showing a basic risk calculation process (Step S300) according to an embodiment of the present disclosure.

FIG. 7 is a flow chart showing the basic risk calculation process (Step S300) described above.

In Step S331, the processor 110 sets the target state parameter ST. It should be noted that the accuracy of the risk calculation process can be further improved by variably setting the target state parameter ST depending on a situation. A highly accurate risk calculation process will be described in detail later.

In Step S332, the processor 110 sets the vehicle state parameter $SV_{ij}$. More specifically, the processor 110 selects the multiple patterns of the vehicle state parameter $SV_{ij}$ one by one.

In Step S333, the processor 110 determines whether or not the vehicle 1 defined by the vehicle state parameter $SV_{ij}$ collides with the target 5 defined by the target state parameter ST. In this Step S333, it is assumed that the vehicle 1 continues a uniform motion at a constant speed $V_j$. The processor 110 determines whether or not a collision between the vehicle 1 and the target 5 occurs based on the vehicle state parameter $SV_{ij}$ and the target state parameter ST. When the collision between the vehicle 1 and the target 5 occurs (Step S333; Yes), the processing proceeds to Step S334. On the other hand, when the collision between the vehicle 1 and the target 5 does not occur (Step S333; No), the processing proceeds to Step S336.

In Step S334, the processor 110 determines whether or not the vehicle 1 collides with the target 5 on the assumption that the above-described emergency braking control operates. A control delay of the emergency braking control (i.e., a delay time from the target detection to the brake actuation) and the first deceleration in the emergency braking control are predetermined parameters that depend on a performance of the emergency braking control. Braking performance information (not shown) indicating such the predetermined parameters is stored in the memory device 120 in advance. The processor 110 determines whether or not the collision between the vehicle 1 and the target 5 occurs based on the vehicle state parameter $SV_{ij}$, the target state parameter ST, and the braking performance information. When the collision between the vehicle 1 and the target 5 occurs (Step S334; Yes), the processing proceeds to Step S335. On the other hand, when the collision between the vehicle 1 and the target 5 does not occur (Step S334; No), the processing proceeds to Step S336.

In the Step S335, the processor 110 calculates the estimated collision speed $U_{ij}$ between the vehicle 1 and the target 5 based on the result of Step S334. Then, the processor 110 calculates the risk value $R_{ij}$ based on the estimated collision speed $U_{ij}$. As the estimated collision speed $U_{ij}$ increases, the risk value $R_{ij}$ increases. For example, the risk value $R_{ij}$ is the estimated collision speed $U_{ij}$ itself. As another example, the risk value $R_{ij}$ may be the square of the estimated collision speed $U_{ij}$. Thereafter, the processing proceeds to Step S337.

In Step S336, the processor 110 sets the risk value $R_{ij}$ to 0 because the estimated collision speed $U_{ij}$ is 0. Thereafter, the processing proceeds to Step S337.

In Step S337, the processor 110 determines whether or not the calculation of the risk value $R_{ij}$ is completed for all the patterns of the vehicle state parameter $SV_{ij}$. When the risk value $R_{ij}$ with respect to any pattern of the vehicle state parameter $SV_{ij}$ is not calculated yet (Step S337; No), the processing returns to Step S332. Steps S332 to S337 are repeated until the calculation of the risk value $R_{ij}$ is completed for all the patterns of the vehicle state parameter $SV_{ij}$. As a result, the risk field RF indicating the distribution of the risk values $R_{ij}$ with respect to all patterns of the vehicle state parameter $SV_{ij}$ is obtained (see FIG. 6).

In this manner, the processor 110 executes the risk calculation process to set (calculate) the risk field RF. Risk information 300 indicating the calculated risk field RF is stored in the memory device 120 (see FIG. 2). After that, the processing proceeds to the next Step S400.

2-4. Step S400

In Step S400, the processor 110 determines whether or not an activation condition of the risk avoidance control is satisfied.

For example, the activation condition of the risk avoidance control includes that "a trajectory of the vehicle 1 when the risk avoidance control is not executed has a point at which the risk value $R_{ij}$ is equal to or greater than an activation threshold Rth."

The trajectory TR0 shown in FIG. 1 represents the trajectory of the vehicle 1 when the risk avoidance control is not executed. For example, it is assumed that the vehicle 1 travels parallel to the roadway 2 (the first lane L1) at a current vehicle speed. The current vehicle speed of the vehicle 1 is obtained from the vehicle state information 220. The position of the roadway 2 (the first lane L1) is obtained from the road configuration information 240 or the map information 270. Therefore, the processor 110 can extrapolate the trajectory TR0 based on the driving environment information 200. Then, the processor 110 determines whether or not the above-described activation condition is satisfied based on the trajectory TR0 and the risk field RF indicated by the risk information 300.

The activation condition of the risk avoidance control may further include that "a time-to-reach T to the target 5 is less than a second threshold Tth." The time-to-reach T is a time required for the vehicle 1 to travel from the current position to a position closest to the target 5. Typically, a timing at which the vehicle 1 comes closest to the target 5 is a timing at which the vehicle 1 passes by the side of the target 5. The current vehicle speed of the vehicle 1 is obtained from the vehicle state information 220. The relative position of the target 5 with respect to the vehicle 1 is obtained from the target information 250. The processor 110 can calculate the time-to-reach T based on the trajectory TR0, the current vehicle speed of the vehicle 1, and the relative position of the target 5. Then, the processor 110 determines whether or not the activation condition is satisfied by comparing the time-to-reach T with the second threshold Tth. It should be noted that the second threshold Tth is larger than the first threshold related to the emergency braking control described above.

The activation condition of the risk avoidance control may further include that the vehicle speed of the vehicle 1 is equal to or higher than a certain speed.

When the activation condition of the risk avoidance control is satisfied (Step S400; Yes), the processing proceeds to Step S500. On the other hand, when the activation condition of the risk avoidance control is not satisfied (Step S400; No), the processing proceeds to Step S600.

2-5. Step S500

In Step S500, the processor 110 executes the risk avoidance control, that is, puts the risk avoidance control into operation. The risk avoidance control is the vehicle travel control for reducing the risk of collision with the target 5, and includes at least one of the steering control and the deceleration control. In the present embodiment, the processor 110 executes the risk avoidance control based on the risk field RF indicated by the risk information 300 such that the risk of collision with the target 5 is reduced.

For example, the processor 110 generates a target trajectory TRt of the vehicle 1 based on the risk field RF. The target trajectory TRt includes a target position and a target speed of the vehicle 1 in the roadway 2. The processor 110 refers to the risk field RF to set the target trajectory TRt such that the risk value $R_{ij}$ on the target trajectory TRt is less than the activation threshold Rth. For example, the processor 110 sets the target trajectory TRt such that the vehicle 1 moves in a direction away from the target 5 (see the trajectory TR1 in FIG. 1). The current position of the vehicle 1 is obtained from the vehicle position information 210. The vehicle speed is obtained from the vehicle state information 220. The position of the roadway 2 is obtained from the road configuration information 240 or the map information 270. Therefore, the processor 110 is able to generate the target trajectory TRt based on the driving environment information 200 and the risk information 300 (the risk field RF).

The processor 110 may generate the target trajectory TRt in consideration of smoothness of a vehicle behavior together with the risk field RF. In that case, the processor 110 sets the target trajectory TRt that achieves both safety and smoothness of the vehicle behavior by using an evaluation function including a risk component and a vehicle behavior component. For details of the target trajectory TRt in which smoothness of the vehicle behavior is also taken into consideration, refer to the above-described Patent Literature 1 (Japanese Laid-Open Patent Application Publication No. JP-2017-206117).

The processor 110 executes at least one of the steering control and the deceleration control so that the vehicle 1 follows the target trajectory TRt. The steering control and the deceleration control are executed based on the driving environment information 200. More specifically, the processor 110 calculates a target steering angle and a target deceleration required for the vehicle 1 to follow the target trajectory TRt. The processor 110 controls the steering device 31 in accordance with the target steering angle. The processor 110 controls the braking device 33 in accordance with the target deceleration.

2-6. Step S600

In Step S600, the processor 110 does not execute the risk avoidance control. That is, the processor 110 does not activate the risk avoidance control. When the risk avoidance control is already in execution, the processor 110 terminates the risk avoidance control.

3. Highly Accurate Risk Calculation Process (Step S300)

In order to appropriately execute the risk avoidance control, it is necessary to appropriately estimate the magnitude of the risk of collision with the target 5 (that is, the risk value $R_{ij}$ and the risk field RF). The reason is that if the risk of collision is overestimated, the risk avoidance control operates excessively or unnecessarily.

According to the technique disclosed in the above-described Patent Literature 1 (Japanese Laid-Open Patent Application Publication No. JP-2017-206117), it is assumed that the imaginary moving object existing in the blind area behind the obstacle moves perpendicularly to the roadway 2 at a predetermined speed and enters the roadway 2. This means that the target state parameter ST (i.e., the expected direction of movement EDT and the expected speed of movement EVT) is the same regardless of the situation. However, an actual target 5 does not necessarily move perpendicularly to the roadway 2 and enter the roadway 2. It can be said that the assumption in Patent Literature 1 is too pessimistic with respect to the actual target 5. If such the assumption is also applied to the actual target 5, the risk of collision is overestimated and thus the risk avoidance control is likely to operate excessively or unnecessarily. An occupant (typically, a driver) of the vehicle 1 may feel a sense of strangeness about the excessive operation or the unnecessary operation of the risk avoidance control.

Figure 8:
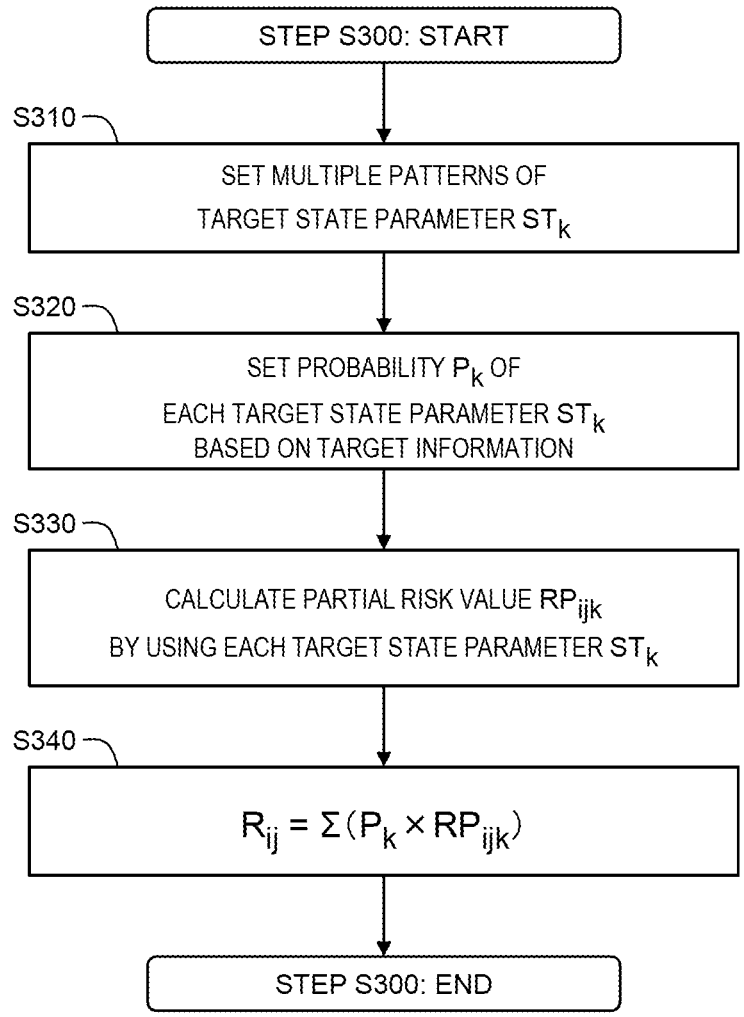
FIG. 8 is a flow chart showing a highly accurate risk calculation process (Step S300) according to an embodiment of the present disclosure.

In view of the above, the present embodiment provides a technique for estimating the risk of collision with higher accuracy in order to suppress the excessive operation or the unnecessary operation of the risk avoidance control. FIG. 8 is a flow chart showing the highly accurate risk calculation process (Step S300) according to the present embodiment.

3-1. Step S310

In Step S310, the processor 110 sets the target state parameter ST. According to the present embodiment, in order to consider various states of movement of the target 5, the target state parameter ST (i.e., the expected direction of movement EDT and the expected speed of movement EVT) is not fixed to one type. Instead, the processor 110 sets multiple patterns of the target state parameter $ST_k$. The index k takes a value from 1 to an integer of 2 or more.

Figure 9:
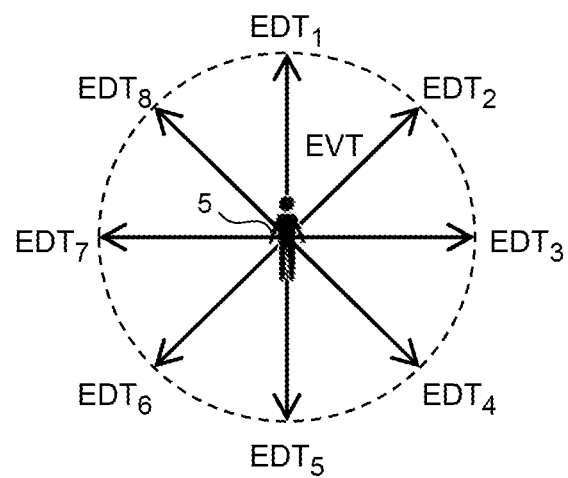
FIG. 9 is a conceptual diagram showing an example of multiple patterns of a target state parameter according to an embodiment of the present disclosure.

FIG. 9 is a conceptual diagram showing an example of the multiple patterns of the target state parameter $ST_k$. In the example shown in FIG. 9, eight patterns of the target state parameter $ST_k$ (k=1 to 8) are set. More specifically, eight patterns of the expected direction of movement $EDT_k$ (k=1 to 8) are set. The expected speed of movement EVT is set to the current speed of movement of the target 5 indicated by the target information 250. The eight patterns of the estimated direction of movement $EDT_k$ are distributed in a circumferential direction with the target 5 at a center. In one embodiment, the eight patterns of the expected direction of movement $EDT_k$ are uniformly distributed in the circumferential direction. In other words, the eight patterns of the expected direction of movement $EDT_k$ are circumferentially distributed at an interval of 45 degrees. As a result, it is possible to sufficiently consider various directions of movement of the target 5 with limited computational resources.

Figure 10:
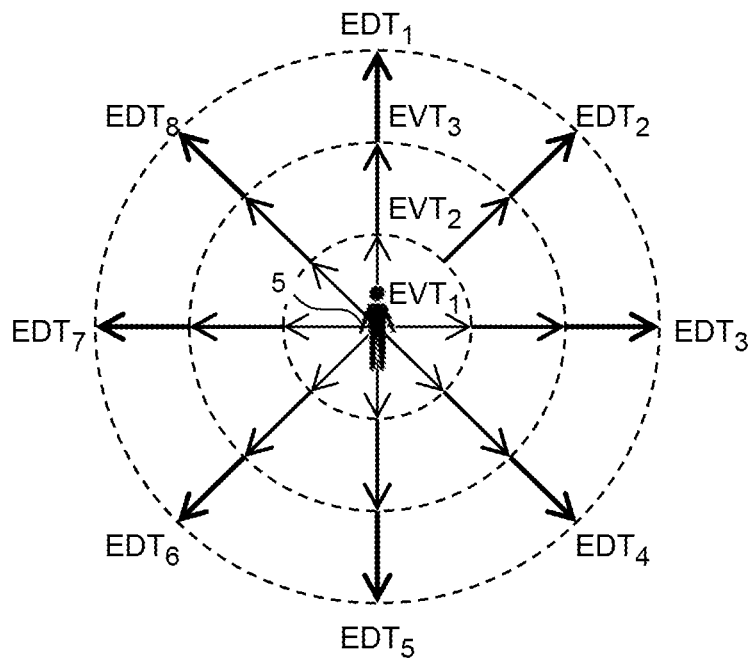
FIG. 10 is a conceptual diagram showing another example of the multiple patterns of the target state parameter according to an embodiment of the present disclosure.

FIG. 10 is a conceptual diagram showing another example of the multiple patterns of the target state parameter $ST_k$. In the example shown in FIG. 10, the target state parameter $ST_k$ is a combination of multiple patterns of the expected direction of movement $EDT_m$ and multiple patterns of the expected speed of movement $EVT_n$. The index m takes a value from 1 to an integer of 2 or more. The index n takes a value from 1 to an integer of 2 or more. For example, as shown in FIG. 10, twenty four patterns of the target state parameter $ST_k$ (k=1 to 24) are obtained by combining eight patterns of the expected direction of movement $EDT_m$ (m=1 to 8) and three patterns of the expected speed of movement $EVT_n$ (n=1 to 3). The eight patterns of the expected direction of movement $EDT_m$ are the same as in the case of FIG. 9 described above. The three patterns of the expected speed of movement $EVT_1$ to $EVT_3$ are set to 0.5 times, 1.0 times, and 1.5 times the current speed of movement of the target 5, respectively. As a result, it is possible to consider various states of movement of the target 5 with limited computational resources.

Each target state parameter $ST_k$ corresponds to a target vector representing the movement of the target 5. A position of a tip of the target vector is a destination candidate of the target 5. Setting the target state parameter $ST_k$ is equivalent to setting the target vector representing the movement of the target 5 and setting the destination candidate of the target 5. Setting the multiple patterns of the target state parameter $ST_k$ is equivalent to setting multiple patterns of the target vector and setting multiple patterns of the destination candidate.

3-2. Step S320 (Probability Setting Process)

In Step S320, the processor 110 executes a "probability setting process" that sets a probability $P_k$ of each target state parameter $ST_k$. Setting the probability $P_k$ of each target state parameter $ST_k$ is equivalent to setting the probability $P_k$ that the target 5 moves to each destination candidate. It should be noted that a sum of respective probabilities $P_k$ of the multiple patterns of the target state parameter $ST_k$ is 1.0.

The target 5 does not move randomly but moves with a certain degree of continuity from its past movement. At least the latest direction of movement and speed of movement of the target 5 serve as clues for estimating future direction of movement and speed of movement. Therefore, the processor 110 sets the probability $P_k$ of each target state parameter $ST_k$ based on at least the target information 250. Hereinafter, various examples of the probability setting process will be described.

3-2-1. First Example

Figure 11:
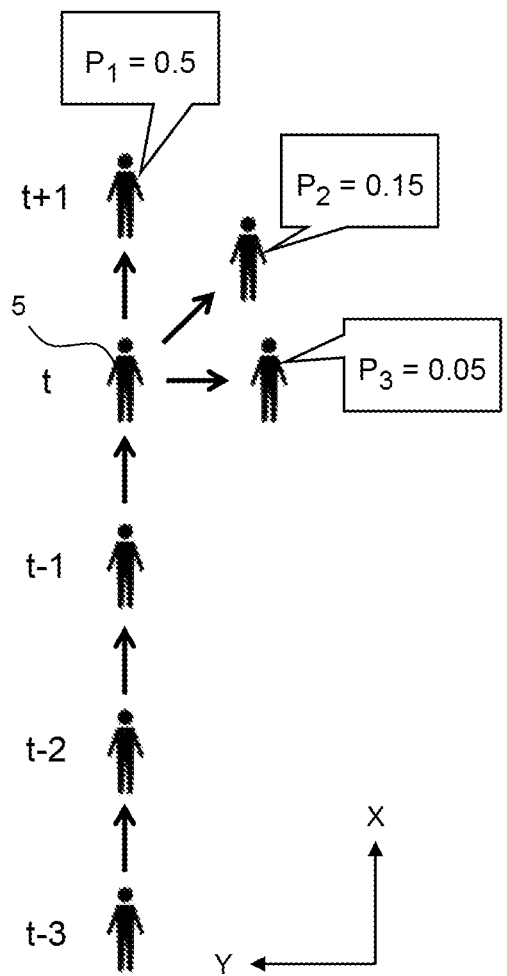
FIG. 11 is a conceptual diagram showing a first example of a probability setting process (Step S320) according to an embodiment of the present disclosure.

FIG. 11 is a conceptual diagram showing a first example of the probability setting process. A time t represents the current time. Times t−3 to t−1 represent past times. A time t+1 represents a future time. The target state parameter $ST_k$ corresponds to the state of movement (i.e., the expected direction of movement EDT and the expected speed of movement EVT) of the target 5 between the current time t and the future time t+1.

The target 5 is, for example, a pedestrian. The target 5 moves in parallel with the travel direction of the vehicle 1 (X-direction) for a certain period of time in the past. Such the target 5 has a high probability of maintaining the direction of movement as it is. Therefore, the probability $ST_1$ of the target state parameter $P_1$ closest to the direction of movement of the target 5 is set to be the highest.

The first example can be generalized as follows. The probability $P_k$ of the target state parameter $ST_k$ is set to be higher as the expected direction of movement EDT of the target state parameter $ST_k$ is closer to the direction of movement of the target 5 indicated by the target information 250. Conversely, the probability $P_k$ of the target state parameter $ST_k$ is set to be lower as the expected direction of movement EDT of the target state parameter $ST_k$ is farther from the direction of movement of the target 5 indicated by the target information 250. By considering the direction of movement of the target 5 indicated by the target information 250 in this manner, it is possible to set the probability $P_k$ of the target state parameter $ST_k$ with high accuracy.

3-2-2. Second Example

Figure 12:
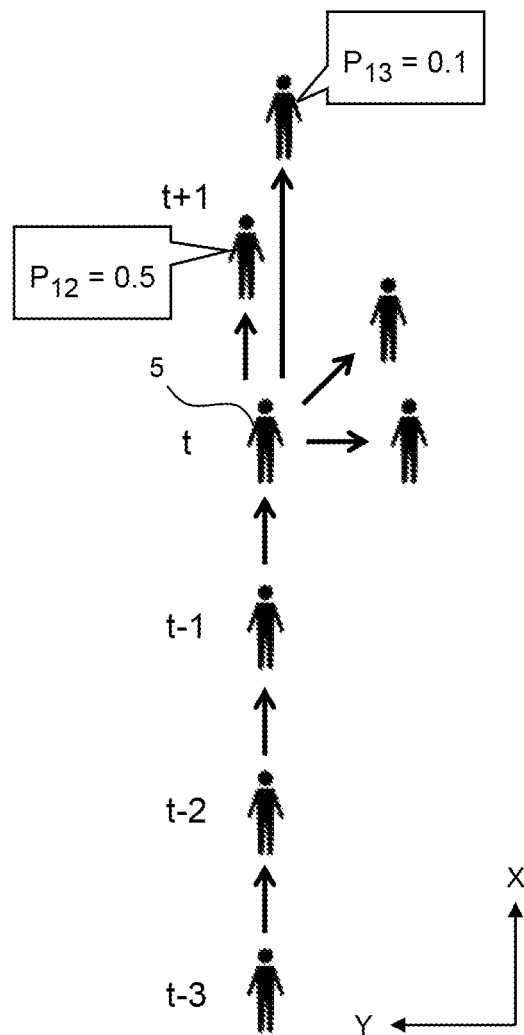
FIG. 12 is a conceptual diagram showing a second example of the probability setting process (Step S320) according to an embodiment of the present disclosure.

FIG. 12 is a conceptual diagram showing a second example of the probability setting process. Description overlapping with the first example will be omitted as appropriate. The target 5 moves at a constant speed for a certain period of time in the past. Such the target 5 has a high probability of maintaining the speed of movement as it is. Therefore, the probability $ST_{12}$ of the target state parameter $P_{12}$ closest to the speed of movement of the target 5 is set to be the highest.

The second example can be generalized as follows. The probability $P_k$ of the target state parameter $ST_k$ is set to be higher as the expected speed of movement EVT of the target state parameter $ST_k$ is closer to the speed of movement of the target 5 indicated by the target information 250. Conversely, the probability $P_k$ of the target state parameter $ST_k$ is set to be lower as the expected speed of movement EVT of the target state parameter $ST_k$ is farther from the speed of movement of the target 5 indicated by the target information 250. By considering the speed of movement of the target 5 indicated by the target information 250 in this manner, it is possible to set the probability $P_k$ of the target state parameter $ST_k$ with high accuracy.

3-2-3. Third Example

Figure 13:
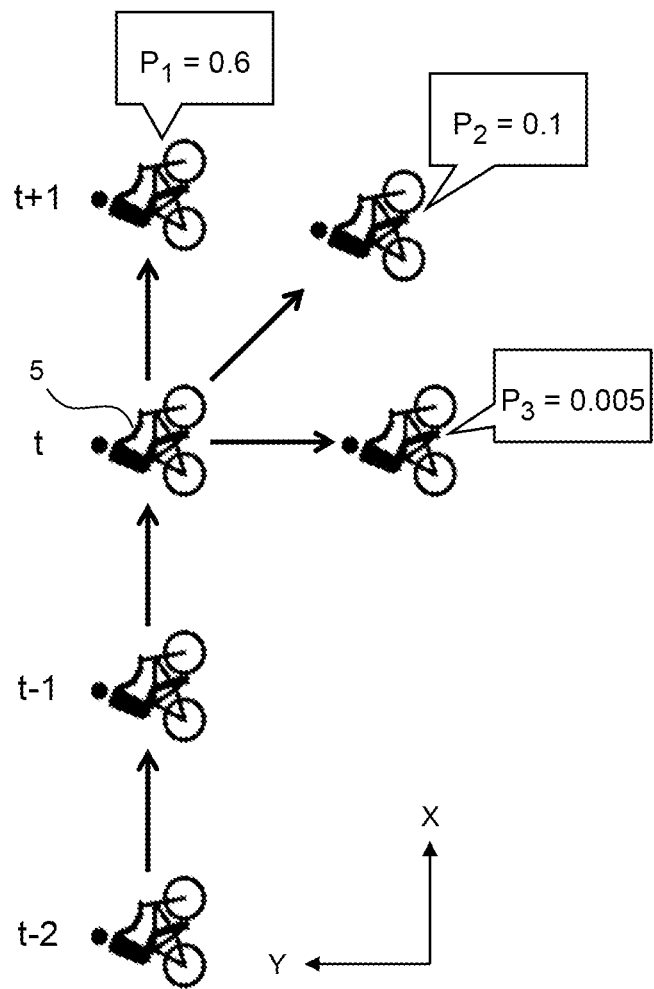
FIG. 13 is a conceptual diagram showing a third example of the probability setting process (Step S320) according to an embodiment of the present disclosure.

FIG. 13 is a conceptual diagram showing a third example of the probability setting process. Description overlapping with the first example will be omitted as appropriate. In the example shown in FIG. 13, the target 5 is a bicycle. Straight-traveling tendency of the bicycle is stronger than that of the pedestrian. It is very unlikely that the bicycle suddenly makes a right angle turn. Therefore, the probability $P_k$ of the target state parameter $ST_k$ close to the direction of movement of the target 5 indicated by the target information 250 is set to be further higher than that in the case where the target 5 is the pedestrian (see FIG. 11).

The third example can be generalized as follows. The target information 250 indicates the type of the target 5 (e.g., a pedestrian, a bicycle, a motorcycle, another vehicle, and the like). The processor 110 sets the probability $P_k$ of each target state parameter $ST_k$ based on the type of the target 5. By considering the type of the target 5 in this manner, the accuracy of the probability setting process is further improved.

3-2-4. Fourth Example

Figure 14:
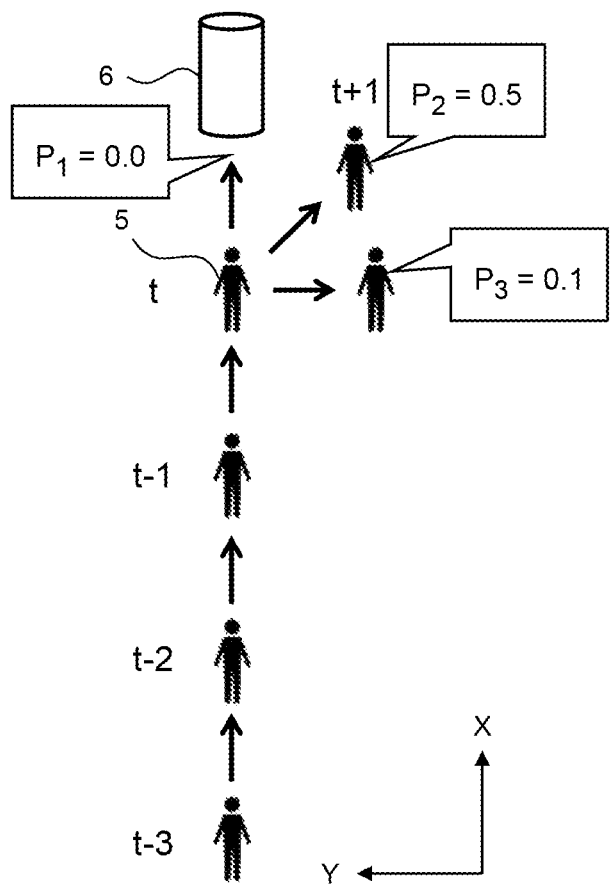
FIG. 14 is a conceptual diagram showing a fourth example of the probability setting process (Step S320) according to an embodiment of the present disclosure.

FIG. 14 is a conceptual diagram showing a fourth example of the probability setting process. Description overlapping with the first example will be omitted as appropriate. When an obstacle 6 such as a utility pole or a signboard exists in the direction of movement, the target 5 is highly likely to move forward with avoiding the obstacle 6. Therefore, the probability $ST_2$ of the target state parameter $P_2$ where the target 5 moves forward with avoiding the obstacle 6 is set to be high. On the other hand, the probability $ST_1$ of the target state parameter $P_1$ where the target 5 collides with the obstacle 6 is set to zero.

Figure 15:
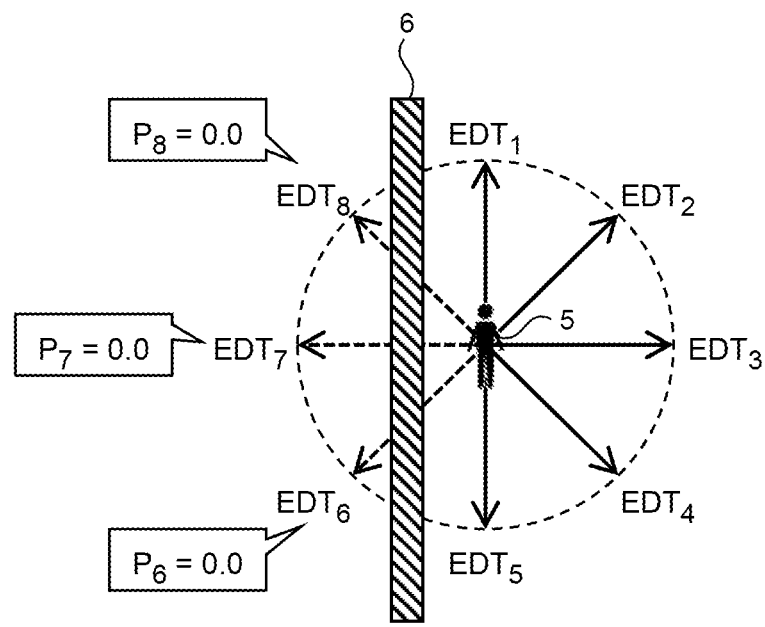
FIG. 15 is a conceptual diagram showing the fourth example of the probability setting process (Step S320) according to the embodiment of the present disclosure.

In an example shown in FIG. 15, the obstacle 6 is a wall-like structure. The target 5 does not move toward such the obstacle 6. Therefore, the probabilities $ST_6$ to $ST_8$ of the target state parameters $P_6$ to $P_8$ where the target 5 moves toward the obstacle 6 are set to zero.

The fourth example can be generalized as follows. The obstacle information 260 indicates a position of the obstacle 6 through which the target 5 cannot pass. Based on the obstacle information 260, the processor 110 sets the probability $P_k$ of the target state parameter $ST_k$ where the obstacle 6 exists in the expected direction of movement EDT to zero. Then, the processor 110 sets the probability $P_k$ of the other target state parameter $ST_k$ based on the target information 250. By taking the obstacle 6 into consideration in this manner, the accuracy of the probability setting process is further improved.

3-2-5. Fifth Example

As long as there is no contradiction, it is also possible to combine some of the first to fourth examples described above.

3-2-6. Probability Setting Information

As described above, the processor 110 dynamically sets the probability $P_k$ of the target state parameter $ST_k$ according to a "situation S." The situation S includes at least the direction of movement and the speed of movement of the target 5 obtained from the target information 250. The situation S may include a past history of movement of the target 5. The situation S may further include a situation around the target 5 (for example, whether or not the obstacle 6 is present).

The probability $P_k$ of the target state parameter $ST_k$ is expressed by a function of the situation S ($P_k$=f(S)). For example, the function f is generated in advance through machine learning (including deep learning). More specifically, the function f is generated in advance by learning movements of the target 5 in many real environments. As another example, the function f may be realized by a Kalman filter. As yet another example, the function f may be set manually.

Figure 16:
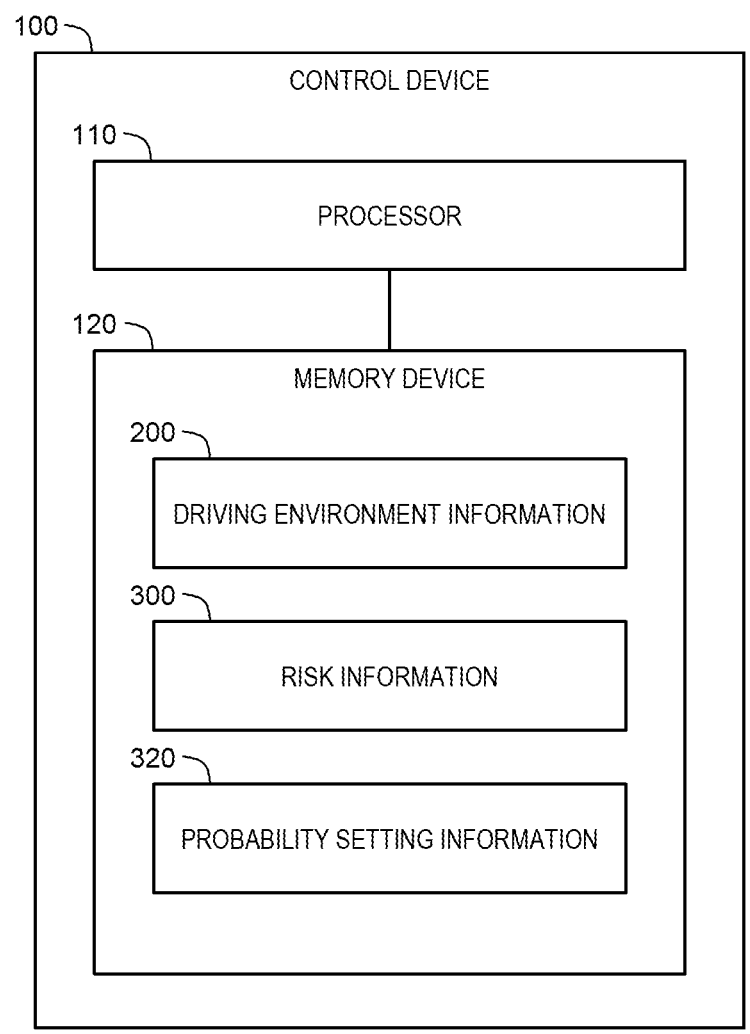
FIG. 16 is a block diagram showing information used in the driving assist system according to an embodiment of the present disclosure.

Probability setting information 320 shown in FIG. 16 indicates the function f that is used for setting the probability $P_k$. The probability setting information 320 is generated in advance and stored in the memory device 120. The situation S is obtained from the driving environment information 200 (the target information 250, the obstacle information 260, and the like). The processor 110 sets the probability $P_k$ according to the situation S based on the driving environment information 200 and the probability setting information 320.

3-3. Step S330

In Step S330, the processor 110 calculates the risk value $R_{ij}$ by using each target state parameter $ST_k$. The risk value $R_{ij}$ calculated by using each target state parameter $ST_k$ is hereinafter referred to as a "partial risk value $RP_{ijk}$." A method of calculating the partial risk value $RP_{ijk}$ is the same as the method of calculating the risk value $R_{ij}$ described in the above Section 2-3 (see FIG. 7). In Step S331, each target state parameter $ST_k$ is used. It can be said that the partial risk value $RP_{ijk}$ is a function of the vehicle state parameter $SV_{ij}$ and the target state parameter $ST_k$.

3-4. Step S340

By the above-described Steps S310 to S330, the probability $P_k$ and the partial risk value $RP_{ijk}$ are obtained for each target state parameter $ST_k$. In Step S340, the processor 110 calculates a final risk value $R_{ij}$ by integrating the partial risk values $RP_{ijk}$ with respect to the all patterns of the target state parameter $ST_k$. More specifically, as represented by the following Equation (1), a sum of products of the probability $P_k$ and the partial risk value $RP_{ijk}$ with respect to the all patterns of the target state parameter $ST_k$ is calculated as the final risk value $R_{ij}$.

[Equation 1]

$$R_{ij} = \sum_k P_k \times RP_{ijk} \quad (1)$$

The risk field RF indicates the distribution of the risk values $R_{ij}$ given by Equation (1). The risk information 300 indicating the calculated risk field RF is stored in the memory device 120 (see FIG. 16). The risk field RF indicated by the risk information 300 is applied to the processes (Steps S400 and S500) related to the risk avoidance control.

4. Effects and Discussion

As described above, according to the present embodiment, the risk of collision with the target 5 existing ahead of the vehicle 1 is represented by the risk field RF. More specifically, the risk field RF indicates the distribution of the risk values $R_{ij}$ with respect to the multiple patterns of the vehicle state parameter $SV_{ij}$. The vehicle state parameter $SV_{ij}$ includes the imaginary relative position [$DLAT_i$, $DLON_i$] between the vehicle 1 and the target 5 and the imaginary velocity $V_j$ of the vehicle 1. The target state parameter ST includes the expected direction of movement EDT and the expected speed of movement EVT of the target 5. The risk value $R_{ij}$ is expressed by the function of the estimated collision speed $U_{ij}$ between the vehicle 1 defined by the vehicle state parameter $SV_{ij}$ and the target 5 defined by the target state parameter ST.

As described above, in the setting of the risk field RF (the risk value $R_{ij}$), the vehicle state parameter $SV_{ij}$ and the target state parameter ST are collectively evaluated. The risk value $R_{ij}$ is a quantitative numerical value based on the estimated collision speed $U_{ij}$. In other words, the risk value $R_{ij}$ has a physical meaning rather than a sensuous one. Therefore, it can be said that the risk field RF (the risk value $R_{ij}$) represents the risk of collision with the target 5 with high accuracy.

Furthermore, according to the present embodiment, the multiple patterns of target state parameter $ST_k$ are taken into consideration in setting the risk field RF. More specifically, the probability $P_k$ of each of the multiple patterns of the target state parameter $ST_k$ is set. The target 5 does not move randomly but moves with a certain degree of continuity from its past movement. At least the latest direction of movement and speed of movement of the target 5 serve as clues for estimating future direction of movement and speed of movement. It is therefore possible to set the probability $P_k$ of each target state parameter $ST_k$ based on the target information 250 indicating the direction of movement and the speed of movement of the target 5. Moreover, the risk value $R_{ij}$ when each target state parameter $ST_k$ is used is calculated as the partial risk value $RP_{ijk}$. Then, the sum of the products of the probability $P_k$ and the partial risk value $RP_{ijk}$ with respect to all patterns of the target state parameter $ST_k$ is used as the final risk value $R_{ij}$.

As described above, in the setting of the risk field RF, the target state parameter ST is not fixed to one type, but the multiple patterns of the target state parameter $ST_k$ are taken into consideration. That is, the multiple patterns of the target state parameter $ST_k$ are reflected in the risk field RF. Therefore, the accuracy of the risk field RF representing the risk of collision with the target 5 is further improved.

The highly accurate risk field RF thus obtained is applied to the risk avoidance control for reducing the risk of collision with the target 5. Since the risk field RF represents the risk of collision with the target 5 with high accuracy, the excessive operation or the unnecessary operation of the risk avoidance control is suppressed. For example, executing the risk avoidance control based on the highly accurate risk field RF makes it possible to suppress the excessive operation of the risk avoidance control. Furthermore, determining whether or not the activation condition of the risk avoidance control is satisfied based on the highly accurate risk field RF makes it possible to suppress the unnecessary operation of the risk avoidance control. As a result, a sense of strangeness about the excessive operation or the unnecessary operation of the risk avoidance control is reduced.

As described above, in the calculation of the risk field RF, the vehicle state parameter $SV_{ij}$ and the target state parameter ST are collectively evaluated. It is therefore possible to easily incorporate the multiple patterns of the target state parameter $ST_k$ into the risk field RF. Moreover, since the risk value $R_{ij}$ is a quantitative numerical value, it is possible to easily decompose and integrate the risk value $R_{ij}$. It can be said that the method according to the present embodiment has a high affinity with the risk field RF.

Furthermore, since the risk value $R_{ij}$ is a quantitative numerical value, it is also possible to superimpose a plurality of risk fields RF with respect to a plurality of targets 5. As an example, let us consider a case shown in FIG. 17 where two different targets 5-1 and 5-2 exist ahead of the vehicle 1. The processor 110 separately calculates the risk fields RF-1 and RF-2 with respect to the targets 5-1 and 5-2, respectively. Then, the processor 110 acquires one final risk field RF by superimposing the risk fields RF-1 and RF-2. For example, the risk values $R_{ij}$ of the risk fields RF-1 and RF-2 are added together. Alternatively, the largest risk value $R_{ij}$ among the risk fields RF-1 and RF-2 is selected. By superimposing the risk fields RF with respect to the plurality of targets 5, it is possible to more accurately grasp the risk of collision and thus to more appropriately perform the risk avoidance control.

Moreover, according to the present embodiment, the target trajectory TRt of the vehicle 1 is generated based on the risk field RF. Since the multiple patterns of the target state parameter $ST_k$ are already reflected in the risk field RF, it is not necessary to individually consider the multiple patterns of the target state parameter $ST_k$ when generating the target trajectory TRt. This contributes to a reduction in computation load required to calculate the target trajectory TRt.

Figure 17:
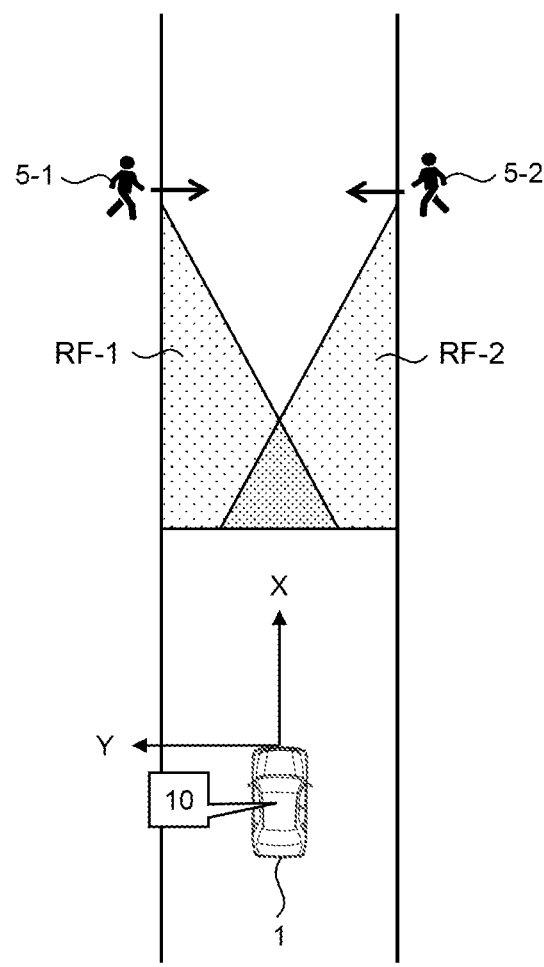
FIG. 17 is a conceptual diagram for explaining superposition of a plurality of risk fields with respect to a plurality of targets in an embodiment of the present disclosure.

As a comparative example, a case where the target trajectory TRt is generated without using the risk field RF is considered. For example, multiple types of the target trajectory $TRt_k$ are generated in consideration of the multiple patterns of target state parameter $ST_k$, respectively. Further, an evaluation value of each of the multiple types of the target trajectory $TRt_k$ is calculated by the use of an evaluation function. Then, based on the evaluation value, one optimum target trajectory TRt is selected from the multiple types of the target trajectory $TRt_k$. However, in the case of this comparative example, the computation load increases. In particular, in a situation in which a plurality of targets 5 exist as shown in FIG. 17, the number of combinations of the target state parameter $ST_k$ regarding the plurality of targets 5 is enormous. In addition, a rule for weighting the plurality of targets 5 is also complicated. When there are a plurality of targets 5, it is not realistic to generate the target trajectory TRt by the method according to the comparative example.

On the other hand, according to the present embodiment, the multiple patterns of the target state parameter $ST_k$ are reflected in one risk field RF. Even when there are a plurality of targets 5, a plurality of risk fields RF with respect to the plurality of targets 5 are integrated into one risk field RF. Then, the target trajectory TRt is calculated only once based on the one risk field RF. Therefore, the computation load is reduced. As the number of targets 5 increases, the effect of reduction in the computation load becomes more remarkable.

What is claimed is:

1. A driving assist system that assists driving of a vehicle, the driving assist system comprising:
    a memory configured to store driving environment information indicating a driving environment for the vehicle; and
    a processor configured to execute, based on the driving environment information, risk avoidance control including at least one of steering control and deceleration control for reducing a risk of collision with a target existing ahead of the vehicle, wherein
    a vehicle state parameter includes an imaginary relative position between the vehicle and the target and an imaginary velocity of the vehicle,
    a target state parameter includes an expected direction of movement and an expected speed of movement of the target,
    a risk value regarding the target is expressed by a function of an estimated collision speed between the vehicle defined by the vehicle state parameter and the target defined by the target state parameter,
    a risk field indicates a distribution of the risk value with respect to multiple patterns of the vehicle state parameter,
    the driving environment information includes target information indicating a position, a direction of movement, and a speed of movement of the target, and
    the processor is further configured to:
        set multiple patterns of the target state parameter;
        set a probability of each of the multiple patterns of the target state parameter based on the target information;
        calculate the risk value when each of the multiple patterns of the target state parameter is used, as a partial risk value;
        set the risk field by using the risk value that is a sum of products of the probability and the partial risk value with respect to the multiple patterns of the target state parameter; and
        execute the risk avoidance control or determine whether or not an activation condition of the risk avoidance control is satisfied, based on the risk field, wherein
    when a number of the target is plural, the processor calculates a plurality of risk fields with respect to the plurality of targets and acquires the risk field by superimposing the plurality of risk fields.

2. The driving assist system according to claim 1, wherein the processor sets the multiple patterns of the target state parameter such that multiple patterns of the expected direction of movement are distributed in a circumferential direction with the target at a center.

3. The driving assist system according to claim 2, wherein the processor sets the multiple patterns of the target state parameter such that the multiple patterns of the expected direction of movement are uniformly distributed in the circumferential direction.

4. The driving assist system according to claim 2, wherein the processor sets the probability of the target state parameter higher as the expected direction of movement of the target state parameter is closer to the direction of movement of the target indicated by the target information.

5. The driving assist system according to claim 2, wherein the driving environment information further includes obstacle information indicating a position of an obstacle through which the target cannot pass, and the processor sets, based on the obstacle information, the probability of the target state parameter where the obstacle exists in the expected direction of movement to zero.

6. The driving assist system according to claim 1, wherein the processor sets the multiple patterns of the target state parameter such that the expected speed of movement includes multiple patterns.

7. The driving assist system according to claim 6, wherein the processor sets the probability of the target state parameter higher as the expected speed of movement of the target state parameter is closer to the speed of movement of the target indicated by the target information.

8. The driving assist system according to claim 1, wherein the target information further indicates a type of the target, and
the processor calculates the probability based on the type of the target.

9. The driving assist system according to claim 1, wherein the processor is further configured to execute emergency braking control that decelerates the vehicle at a first deceleration when a time-to-collision with the target becomes less than a first threshold, and
the processor calculates the estimated collision speed in consideration of an operation of the emergency braking control and calculates the risk value based on the estimated collision speed.

10. The driving assist system according to claim 1, wherein the processor is further configured to:
set multiple patterns for each of a plurality of vehicle state parameters;
calculate a plurality of partial risk values based on the multiple patterns of the state parameters and the plurality of vehicle state parameters; and
set the risk field based on a sum of the products of the probability of each of the multiple patterns of the target state parameter and the plurality of partial risk values.

11. The driving assist system according to claim 1, wherein the risk value is a square of the estimated collision speed.

12. The driving assist system according to claim 1, wherein the risk field indicates the distribution of the risk value in a three-dimensional space defined by a longitudinal distance between the vehicle and the target, a lateral distance between the vehicle and the target, and the imaginary velocity of the vehicle.

* * * * *